United States Patent
Mikov et al.

(10) Patent No.: US 9,674,539 B2
(45) Date of Patent: Jun. 6, 2017

(54) CONCURRENT DECOMPRESSION OF MULTIPLE VIDEO STREAMS WITH CONSTRAINED DECOMPRESSION RESOURCES

(71) Applicant: INFOCUS CORPORATION, Portland, OR (US)

(72) Inventors: Tzvetan Mikov, Pleasant Hill, CA (US); Stanislav Angelov, Pleasanton, CA (US); Robert Gardyne, Oakland, CA (US)

(73) Assignee: INFOCUS CORPORATION, Portland, OR (US)

( * ) Notice: Subject to any disclaimer, the term of this patent is extended or adjusted under 35 U.S.C. 154(b) by 561 days.

(21) Appl. No.: 13/828,619

(22) Filed: Mar. 14, 2013

(65) Prior Publication Data

US 2014/0269942 A1    Sep. 18, 2014

(51) Int. Cl.
  *H04N 19/436* (2014.01)
  *H04N 19/172* (2014.01)
  *H04N 19/132* (2014.01)
  *H04N 19/156* (2014.01)
  *H04N 19/44* (2014.01)

(52) U.S. Cl.
  CPC ......... *H04N 19/436* (2014.11); *H04N 19/132* (2014.11); *H04N 19/156* (2014.11); *H04N 19/172* (2014.11); *H04N 19/44* (2014.11)

(58) Field of Classification Search
  CPC ....................................................... H04N 7/26
  See application file for complete search history.

(56) References Cited

U.S. PATENT DOCUMENTS

| | | | |
|---|---|---|---|
| 7,471,337 B2* | 12/2008 | Wells | H04N 7/56 348/512 |
| 9,083,986 B2* | 7/2015 | MacInnis | H04N 19/172 |
| 2005/0018775 A1* | 1/2005 | Subramanian et al. | 375/240.25 |
| 2005/0276282 A1* | 12/2005 | Wells | H04N 7/56 370/503 |
| 2008/0267222 A1* | 10/2008 | Leung et al. | 370/503 |
| 2008/0273858 A1* | 11/2008 | Wald et al. | 386/68 |
| 2010/0020825 A1* | 1/2010 | Bass et al. | 370/477 |
| 2010/0257320 A1* | 10/2010 | Bass et al. | 711/136 |
| 2010/0278271 A1* | 11/2010 | MacInnis | H04N 19/172 375/240.18 |

\* cited by examiner

*Primary Examiner* — Dave Czekaj
*Assistant Examiner* — Kehinde O Abimbola
(74) *Attorney, Agent, or Firm* — McCoy Russell LLP

(57) ABSTRACT

A method and system for gracefully reducing demands for shared decompression resources required to present multiple video streams concurrently such that their streaming video content is simultaneously available for further processing or display. In particular, it relates to the use of presentation time stamps for incoming frames with reference to a time base clock and a threshold to determine if the decompression resources are falling behind in their ability to process incoming frames in real time. If this occurs then frames are dropped, i.e. discarded without being decompressed, with preference given to dropping incremental frames rather than key frames.

25 Claims, 7 Drawing Sheets

CONCURRENT DECOMPRESSION OF MULTIPLE VIDEO STREAMS WITH CONSTRAINED DECOMPRESSION RESOURCES

BACKGROUND

The technology disclosed relates to decompression of video streams. In particular, gracefully reducing demands for shared decompression resources required to present multiple streams concurrently such that the streaming video content in the multiple streams is concurrently available for further processing or display. The decompression resources may be one or more general purpose CPUs used for unrelated workloads, or specialized decompression resources shared among multiple video streams, or a combination of both.

The use of video streaming for applications such as surveillance and video conferencing has grown significantly as the cost of the hardware has declined and the availability of wireless and wired network connectivity has increased. As a result, the use of multiple video streams has increased, permitting multiple individuals from different physical locations to collaborate and also permitting monitoring from multiple locations to be aggregated at a single destination.

Historically the bottleneck in the process has been the available bandwidth in the communications link between the video source and the destination. Thus, considerable effort has been invested in compressing raw video in order to conserve bandwidth. On the receiving side, given the advances in compression, much effort was initially invested in designing and building faster decoders to decompress incoming video frames. However, as CPU processing power has continued to follow Moore's law and new multi-core architectures have been developed, there has also been a transition from using specialized decoding hardware to using general purpose computers such as those in laptops, desktops and even mobile devices.

The culmination of this trend is that these general purpose computing devices, which are typically running many processes at once, are now being used to decompress and process multiple video streams concurrently. As a result, the processing load in these devices varies widely not only due to the variability of incoming video streams but also due to other processes unrelated to video processing.

Therefore, there is an opportunity to introduce improved management of available decompression resources such that incoming video streams may continue to be concurrently processed or displayed without overloading these resources.

SUMMARY

The technology disclosed relates to gracefully reducing demands for shared decompression resources required to present multiple video streams concurrently such that the streaming video content in the multiple video streams is concurrently available for further processing or display. In particular, it relates to the use of presentation time stamps for incoming frames with reference to a time base clock and a threshold to determine if the decompression resources are falling behind in their ability to process incoming frames in real time. When decompression falls behind, frames are selectively dropped, i.e. discarded without being decompressed, with preference given to dropping incremental frames rather than key frames. This avoids processing crashes.

Other aspects and advantages of the technology disclosed can be seen on review of the drawings, the detailed description and the claims, which follow.

DETAILED DESCRIPTION

The technology disclosed relates to decompression of multiple video streams. The problem addressed is how to gracefully decrease the demand for decompression resources so that many video streams, typically more than eight streams, continue to be decompressed and updated and kept current for subsequent processing or display, without decompression crashes.

The technology disclosed addresses circumstances in which decompression resources are the processing bottleneck. It is assumed that the network or another video feed is capable of supplying more video data than the decompression resources can handle.

The following detailed description is made with reference to the figures. Preferred embodiments are described to illustrate the technology disclosed, not to limit its scope, which is defined by the claims. Those of ordinary skill in the art will recognize a variety of applicable variations on the description that follows.

The technology disclosed can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

A detailed description of implementations of the technology disclosed is provided with reference to the FIGS. 1-7.

Figure 1:
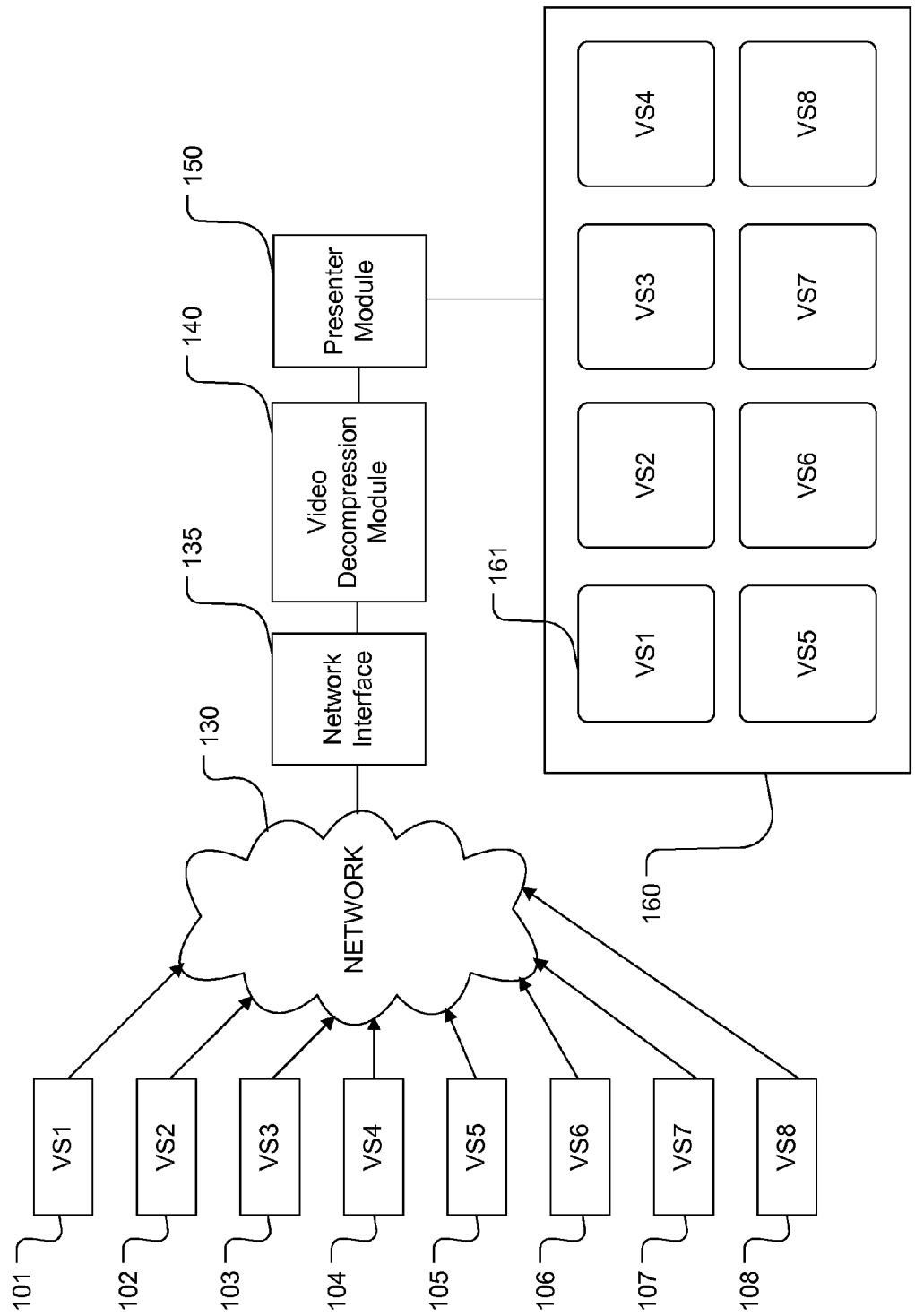
FIG. 1 is a block diagram of an example environment in which the technology disclosed would be used via a network with eight incoming video streams to be decompressed and displayed, each in their own window.

FIG. 1 illustrates a block diagram of an example environment in which the technologies disclosed herein can be used. There are eight video streams 101 through 108 which are transmitted via a network 130 to a network interface 135 which presents them to a video decompression module 140. After decompression or decoding the uncompressed frames from the video streams are sent to a presenter module 150 which may output the frames for further processing or more typically to a display 160 which includes a display device such as a computer monitor, where they are each displayed in their own window on the display surface. In some implementations, the decompressed frames need not be displayed, but may be sent for further processing such as in a security system wherein the processing would consist of performing facial recognition for identification purposes.

Although this example contains eight video streams, the technology disclosed is designed to work with any number of video streams, typically more than available decompression resources are able to keep current. In some instances it may be practical to use as many as 50 or even 100 video streams. In other cases it may only be possible to handle as few as 2 or 3 video streams and possibly only one if the decompression resources, such as a general purpose CPU, are shared with unrelated workloads. This range takes into account the available resources and the loads imposed. First, the decompression resources may comprise as little as one personal computer or as much as a high performance commercial server with specialized hardware. Second, the load imposed by incoming video streams may change radically during the course of normal use depending on how many video sources are streaming images, the complexity of the images and the rate at which the images are changing. Third, the decompression resources may include a general purpose computer such as that in a laptop or desktop, which is running other processes unrelated to video processing that may be using widely varying amounts of that computer's processing capacity.

In environments addressed by the technology disclosed, there is a limit to the total available decompression resources. For example, video streams of increasing complexity, such as those having an increased bit rate or resolution, as well as the addition of video streams will increase the decompression load. Consequently, with an increased load, fewer decompression resources will be available for each stream. At some point the decompression resources can become overloaded and one or more of the video streams will not have enough of the decompression resources to decompress all of the incoming frames. If frames are processed on an FIFO basis, the decompressed frames will fall behind relative to their corresponding presentation times. In some cases the resulting images, such as those on a display, may appear pixelated, may be displayed at irregular intervals and may occasionally appear frozen. The above problems may be prevented or at least mitigated in part by detecting the condition in which the decompression resources are becoming overloaded and mitigating this condition by dropping frames.

Figure 2:
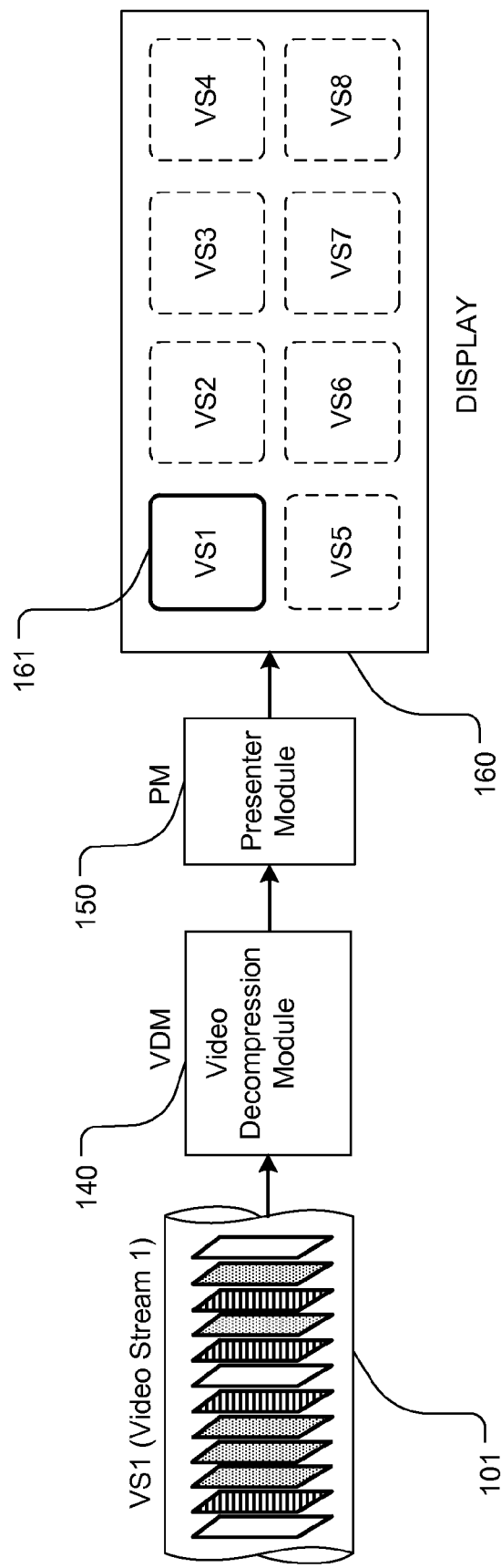
FIG. 2 shows a video stream with several incoming compressed frames waiting to be decompressed, presented and displayed.

FIG. 2 illustrates several frames of a single video stream VS1 101 arriving as input to the video decompression module VDM 140. In practice, the decompression process is often referred to as "decoding" and the associated hardware and software may be referred to as a "decoder." The underlying rationale is that when frames are compressed they are undergoing a form of "encoding" in which the goal is to "encode" more information in fewer bits in a digital system. In this sense, compression and decompression may be considered a subset of encoding and decoding respectively, and hence the terms are often used interchangeably. After being decompressed the incoming frames are sent to the presenter module FIG. 2 PM 150 and subsequently sent for additional processing or display as shown in window VS1 161.

Figure 3:
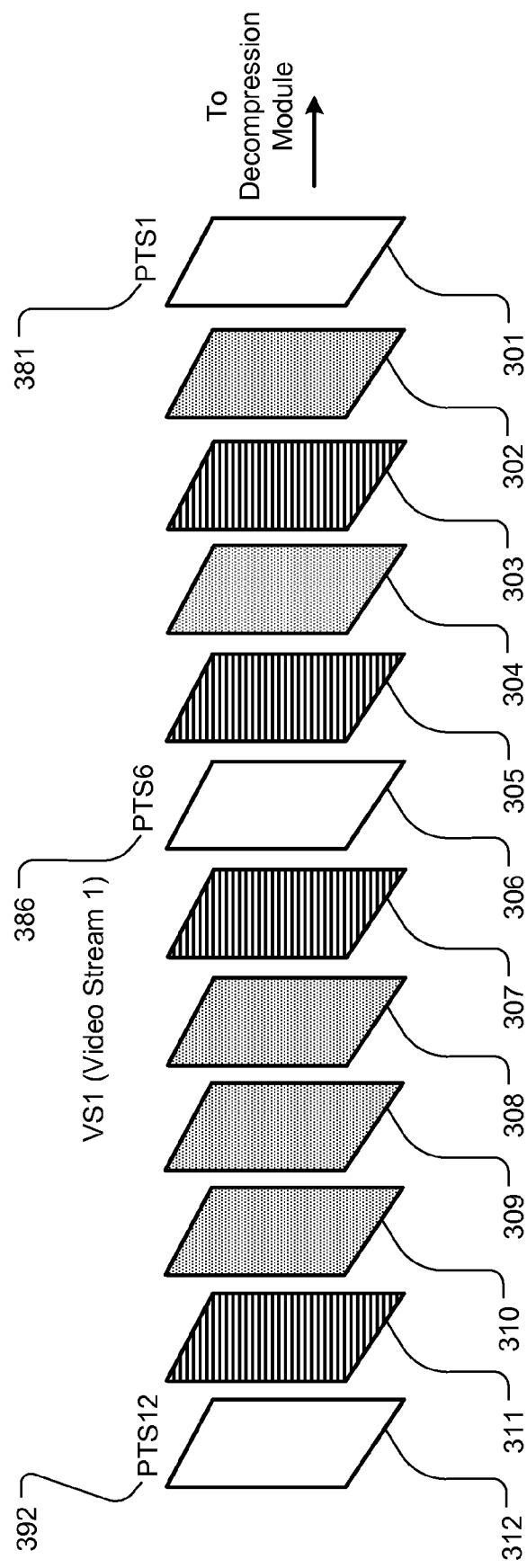
FIG. 3 is an expanded view of the frames shown in FIG. 2 in which key frames are labeled with timestamps (PTSs).

FIG. 3 is an expanded view of frames in a video stream such as video stream VS1 in FIG. 1 and FIG. 2. Frame types include key frames and incremental frames. Each of these has an associated presentation time stamp, abbreviated PTS, that indicates when it should be presented by the presenter module 150 in FIG. 2 for display or further processing. The solid filled frames in FIG. 3 301, 306, 312 are key frames and these are shown with their respective PTS values 381, 386, 392. Being key frames, these frames contain no references to any frames except themselves. When decompressed, they provide an image without depending on any additional frames. In the MPEG standard, these frames are called "Intra" frames or I-frames. The remaining frames, 302-305 and 307-311, are incremental frames which depend upon information in additional frames which precede or follow them temporally. These incremental frames may not arrive in the order of display. As an example, using the MPEG standard, frame 302 could be a "predictive" frame (P-frame) which contains references to its preceding frame 301 in order to predict some of the information being encoded in order to achieve better compression. The MPEG standard also includes "bidirectional" frames or B-frames that achieve compression by referencing both preceding and following frames. In this example, if frame 303 were a B-frame, it would need to reference two other frames, one preceding it and one following it. Both the preceding and following frames would need to be decompressed prior to applying incremental B-frame 303. Transmission of the B-frame may be delayed until after the frames on which it depends. In this example, frame 303 could be an intermediate B-frame between frames 301 and 302 and thus frame 303 could arrive after frames 301 and 302, even though it would be decompressed and sent to the presenter after frame 301 and before frame 302.

Frames are not required to arrive at fixed time intervals. In practice, they arrive at varying time intervals impacted by factors including jitter in a communications link, which in turn depends on variations in latency and network load. In another type of communications link such as a downlink from a satellite, the time intervals between frames would exhibit much less jitter than a packet-based network such as an IP (Internet Protocol) network like the Internet. Thus the technology disclosed herein may be used with any communication link in which video streams are being received from a source including: a packet-based network, a satellite based synchronous or asynchronous network and even the output from a DVD player.

FIG. 3 also shows presentation time stamps PTS1 381, PTS6 386 and PTS12 392 for frames 301, 306 and 312 respectively. The PTS can be found in the headers of key frames and some other frames in a video stream. A PTS also may be obtained by calculating it using data from the video stream optionally in conjunction with known characteristics of the video stream such as the frame rate, as further explained below. It indicates when each frame is to be presented. The PTS can be used to synchronize different types of streams, such as an audio stream with a video stream. Another use of the PTS is to indicate when the frame is to be presented for further processing or display.

The PTS is referenced to a clock value such as the program clock reference ("PCR") or system clock reference ("SCR"), both of which are transmitted in the transport stream or program stream which contains the video stream. Further details are given in MPEG standards documents.

Departing from the standard prescribed use of the PTS, the technology disclosed makes use of the PTS in an unusual way to provide a mechanism for gracefully decreasing the demand for decompression resources while keeping the display of multiple video streams as current as possible. The PTS of a first key frame in a video stream is obtained and compared to a time base clock accessible to a video stream processor. The difference between the PTS value and the time base clock value is saved as the initial offset value, or "delta," and is used as the benchmark against which the PTS values of subsequent frames may be compared. Typically, a system clock is used as the time base clock, but in alternate embodiments it may be any clock available to the processor.

After the benchmark "delta" has been obtained and saved for the first frame in the video stream, the PTS of a succeeding frame is obtained. A current frame "delta" for this succeeding next frame is calculated in the same way, by taking the difference between the succeeding frame PTS and the time base clock.

The difference between the succeeding frame delta and the benchmark delta is calculated. If it exceeds a predefined threshold, then selected frames are dropped. Dropped frames are discarded without processing until a new key frame is selected. In some implementations, the new key frame or at least an occasional new key frame is benchmarked to create a new benchmark delta value. This can be useful to avoid issues of clock drift and packet dispatch postponement. The process continues as before, calculating and comparing the delta values for successive incoming frames to benchmark delta values.

The technologies provided in the technology disclosed take advantage of the fact that incremental frames may be dropped, discarded or bypassed and not decompressed, favoring decompression and presentation of key frames. This keeps frames in a video stream as current as possible while decreasing the demand for resources to decompress the video stream. As such, this technology may be applied to the decompression of multiple video streams so that they are available for concurrent viewing or further processing. In the preferred embodiment, incremental frames of any type are dropped: in an MPEG compliant video stream both P-frames and B-frames would be dropped and the next chosen frame would be an I-frame. In an alternate embodiment, only selected incremental frames are dropped: for instance, in an MPEG compliant environment only B-frames would be dropped.

Figure 4A:
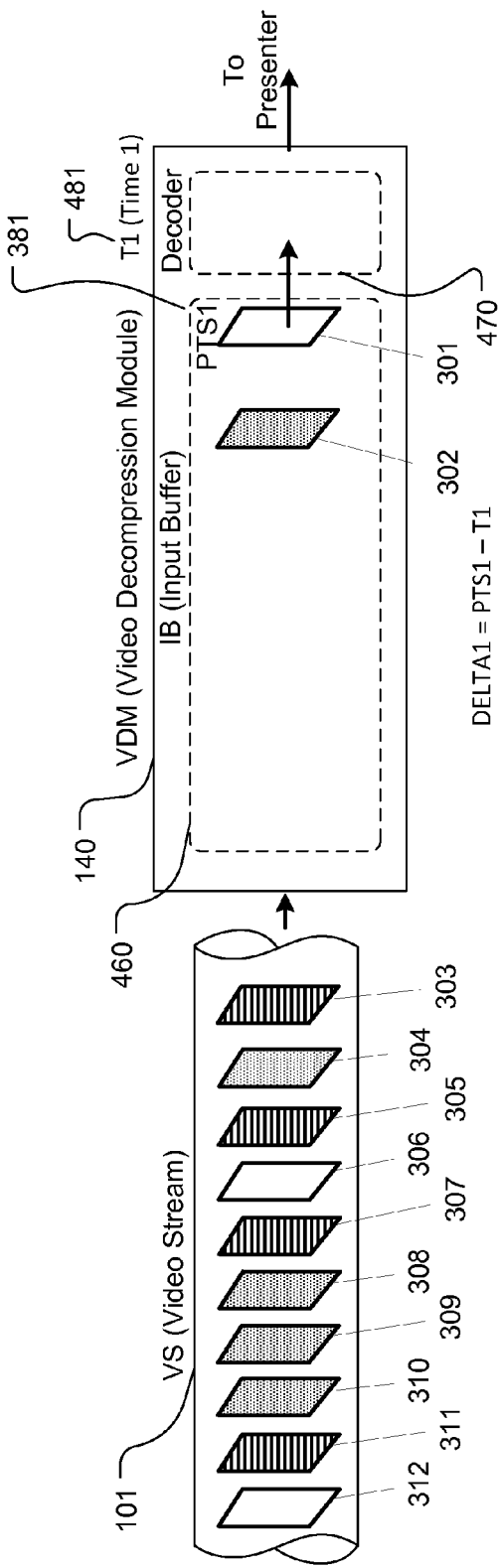
FIG. 4A shows the state of the video decompression module when it is able to keep up with the incoming frames and is able to decompress them fast enough to present them in real time.
Figure 4B:
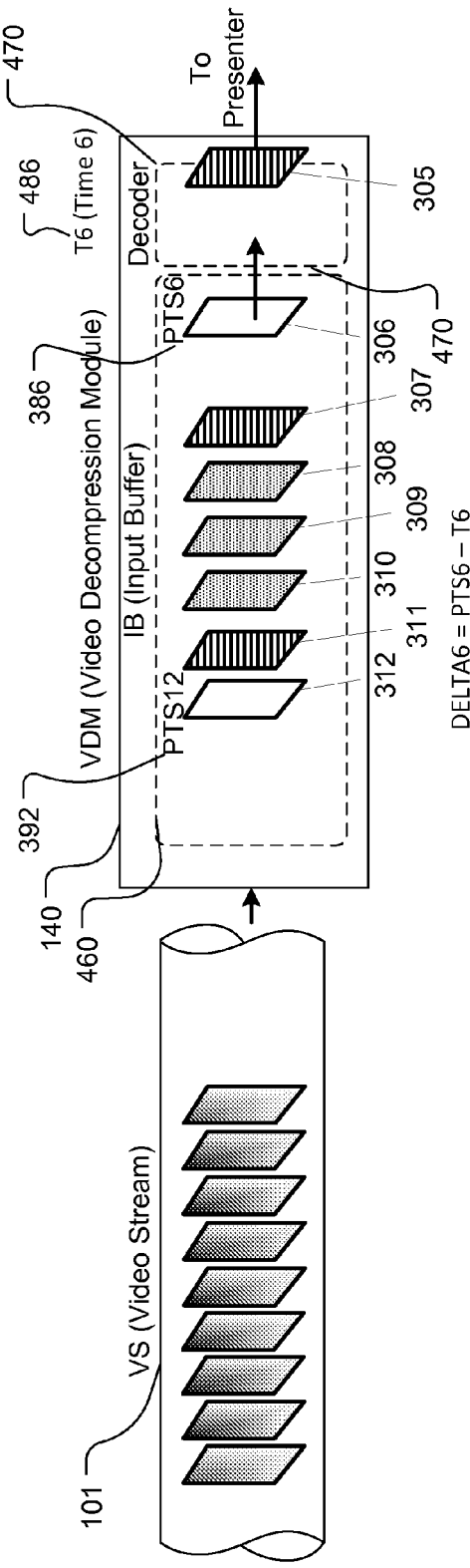
FIG. 4B shows the state of the video decompression module when it is falling behind and is not able to decompress the incoming frames as fast as they are arriving and present them in real time.

However dropping only B-frames and continuing to process P-frames provides less savings in decompression resources than dropping both B-frames and P-frames. Note also that most video encoding processes ensure that frames are transmitted in the order they are to be decoded. FIGS. 4A and 4B show how key frames are selected for a particular video stream in the preferred embodiment when the decompression resources fall behind.

FIG. 4A and FIG. 4B show the transition from normal operation in FIG. 4A, in which the decompression resources can keep up with the incoming video stream to the overload condition, in which the decompression resources are falling behind in processing the incoming video stream. FIG. 4A shows the state of a video stream VS 101 in normal operation at time T1 481. FIG. 4B shows the state of the video stream VS 101 having falling behind at time T6 486. At time T1 in FIG. 4A, frame 301 is just entering decoder 470 and frame 302 is queued in the input buffer IB 460 waiting to be processed. This is the normal state of the VDM 140 when it is keeping up with the video stream VS 101. For purposes of this example, frame 301 is the first frame in VS 101 with corresponding presentation time stamp PTS1 381. In FIG. 4A, a benchmark DELTA1 is established by calculating the difference between PTS1 381 and a time base clock as described above for FIG. 3. As shown in FIG. 4B the decompression resources in VDM 140 are falling behind and multiple incoming frames are queued up in the input buffer IB 460 for decompression by decoder 470. In FIG. 4B frame 306 with PTS6 386 is shown as entering decoder 470. If the difference between DELTA6 and DELTA1 exceeds a predetermined threshold, then frames will be dropped in order to allow the decompression resources to present future frames as current as possible. In some implementations, the threshold value is 500 milliseconds. For instance if the maximum allowable network jitter is 400 milliseconds the threshold must be greater than this value. The upper limit of the threshold is determined by the maximum allowable presentation delay. Hence if this limit is one second then choosing a value of 500 milliseconds would satisfy both design parameters.

Jitter in this context is the variance in network latency, in the time it takes for a packet to reach its destination. Packet networks often experience network jitter values of 50 to 250 milliseconds. A dedicated video network would be closer to 10-20 milliseconds and a typical corporate network would be in the range of 100 milliseconds of jitter. Thus, one range of practical threshold values would be from 300 to 500 milliseconds. Threshold values at or in a range of 150 to 800 milliseconds may be used in special circumstances. For instance, 150 milliseconds could work in a high performance dedicated video network and 800 milliseconds could be used with a network having higher jitter. In some implementations, the threshold could be made dynamic by estimating the jitter in a communications link and setting the threshold relative to the estimated latency. For instance, the threshold could be 95 percent of the maximum jitter over a one minute interval.

To continue the example in FIG. 4B, once the difference between DELTA6 and DELTA1 exceeds the threshold, frame 306 and all of the incremental frames 307-311 will be dropped. Key frame 312 will be the next frame processed by the decoder 470. By performing the threshold test for frame 306 prior to decompression, processing time is saved.

In the FIG. 4B example, since frames arrive in the order to be decoded it is possible to drop incremental frames 310 and 311 without dropping frames 307-309, since the frame following frame 311 is a key frame 312 and by definition has no dependencies. It does not work to decode frame 310 after dropping frame 309, because frame 310 depends on at least one of the frames 307-309. Two implementations of deciding which frames to drop are given in flowchart form in FIG. 5 and FIG. 6.

Figure 5:
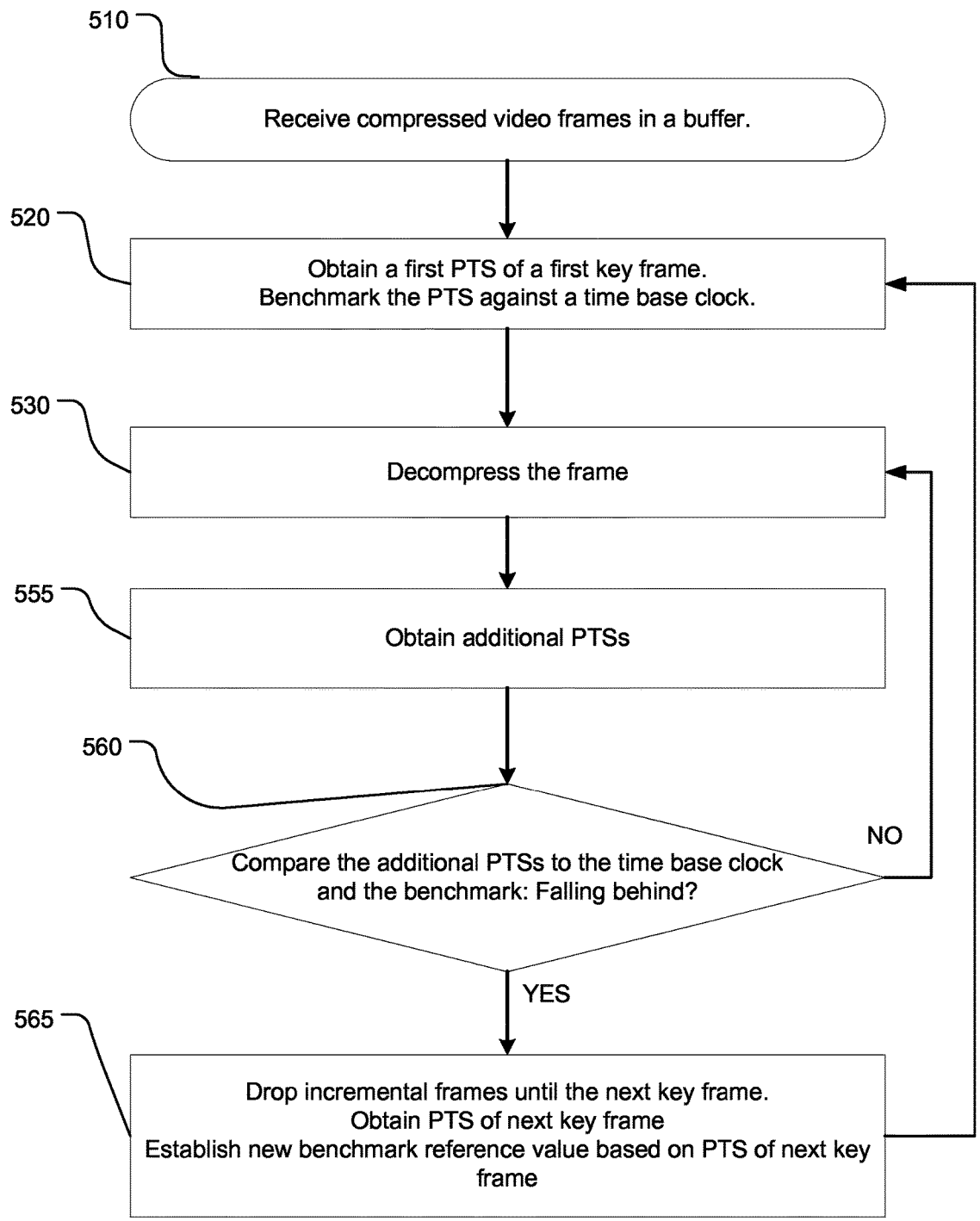
FIG. 5 shows a flow chart of a simplified process for deciding when to drop frames and how to select which frames are dropped.

FIG. 5 shows a flow chart of a simplified process for deciding when to drop frames and how to select which frames are dropped. Briefly, a benchmark reference value is established for the time difference between the PTS of the first key frame and the time base clock. As long as successive frames have a time difference between their PTS and the time base clock that does not differ from the benchmark reference value by more than a threshold value, decompression of these frames continues and they are sent to the presenter as in FIG. 4B. However, if any frames have a time difference between their PTS and the time base clock that differs from the benchmark delta by more than a threshold value, then subsequent incremental frames are dropped, until the next key frame 312 is available. In some implementations, a new benchmark is calculated using the new key frame's PTS. This process effectively resynchronizes display of frames in the video stream to the time base clock. The first step in the flowchart of FIG. 5 is to receive a stream of compressed video frames in an input buffer as shown in step 510. Step 520 obtains a first PTS of the first key frame and compares it to a time base clock to establish a benchmark reference value DELTA_BENCH. The benchmark delta is used to check whether successive frames are being kept current with respect to a threshold. In the preferred embodiment DELTA_BENCH is the absolute value of the difference between the presentation time stamp PTS of the key frame being used as a reference, and a time base clock: DELTA_BENCH=ABS((PTS of key frame)−(current time base clock value)). An absolute value can be used in order to keep the result positive for a more efficient threshold comparison, at the risk of mistaking decompression ahead of schedule for being behind schedule due to an overload. DELTA_BENCH is initially set using the first key frame in the video stream and may subsequently be reset using a key frame used for resynchronization. A new benchmark reference value may be established in step 565. The time base clock may be any clock accessible to the processor. In practice, the time base clock is typically the system clock used by the processor. In alternate embodiments, it may be one of several clocks accessible by the processor. The threshold may be set to a fixed value as described in FIG. 4B above or it may be dynamically calculated by performing appropriate measurements on the communication channel. Such measurements would include characteristics such as jitter and latency. The threshold value should be set to a value greater than the normally expected jitter in order to avoid unnecessary resynchronization. As noted in the description of FIG. 4B, one threshold value is 500 milliseconds.

After the benchmark reference value DELTA_BENCH is calculated and saved, step 530 removes the frame from the input buffer and sends it to the decoder for decompression and thence to the presenter as shown in FIG. 4B. Returning to FIG. 5, step 555 obtains the PTS of the next frame in the buffer for which a PTS is available. This may be the frame that immediately follows the previously decompressed frame or a frame subsequent to the previously decompressed frame. Step 560 then compares this PTS to the time base clock and the benchmark reference value by first calculating the absolute value of the difference between its PTS and the time base clock in the same manner as the benchmark calculation performed above: DELTA_NEXT=ABS((PTS of next frame)−(time base clock)), and then comparing the difference between DELTA_NEXT and DELTA_BENCH to see if it exceeds a threshold. In a system which is keeping up with the incoming video stream, DELTA_NEXT and DELTA_BENCH should be approximately equal within a tolerance. In the preferred implementation this tolerance is given by a threshold. As noted above, a preferred threshold value is 500 milliseconds: THRESHOLD=500. The rationale for this is that in order to preserve reasonable video quality, a jitter value of 400 milliseconds should not be exceeded. Jitter is defined as the variance in network latency which is in turn the time it takes for a message to travel from source to destination.

The comparison done in step 560 detects whether the decompression resources are falling behind by comparing the difference between DELTA_NEXT and DELTA_BENCH to the threshold: If ((DELTA_NEXT−DELTA_BENCH)>THRESHOLD), then decompression resources are falling behind and the process proceeds to FIG. 5 step 565. Incremental frames in the input buffer (460 in FIG. 4) are dropped until the next key frame is found. As described above, it may be possible to drop only selected incremental frames and use remaining incremental frames. If there is no key frame found in the input buffer, then the process waits for one to be received, obtains its PTS, and optionally establishes a new benchmark reference value by setting the benchmark reference value DELTA_BENCH=DELTA_NEXT. The process continues at step 530. The resetting of the benchmark reference value is also referred to as resynchronization and is done to avoid the risk of immediately having to resynchronize on the next frame, possibly owing to drift in the time base clock. Other advantages of resynchronization include limiting the time base clock drift to a maximum value which also limits the maximum required input buffer sizes. Alternate embodiments may choose to forego resynchronization.

Figure 6:
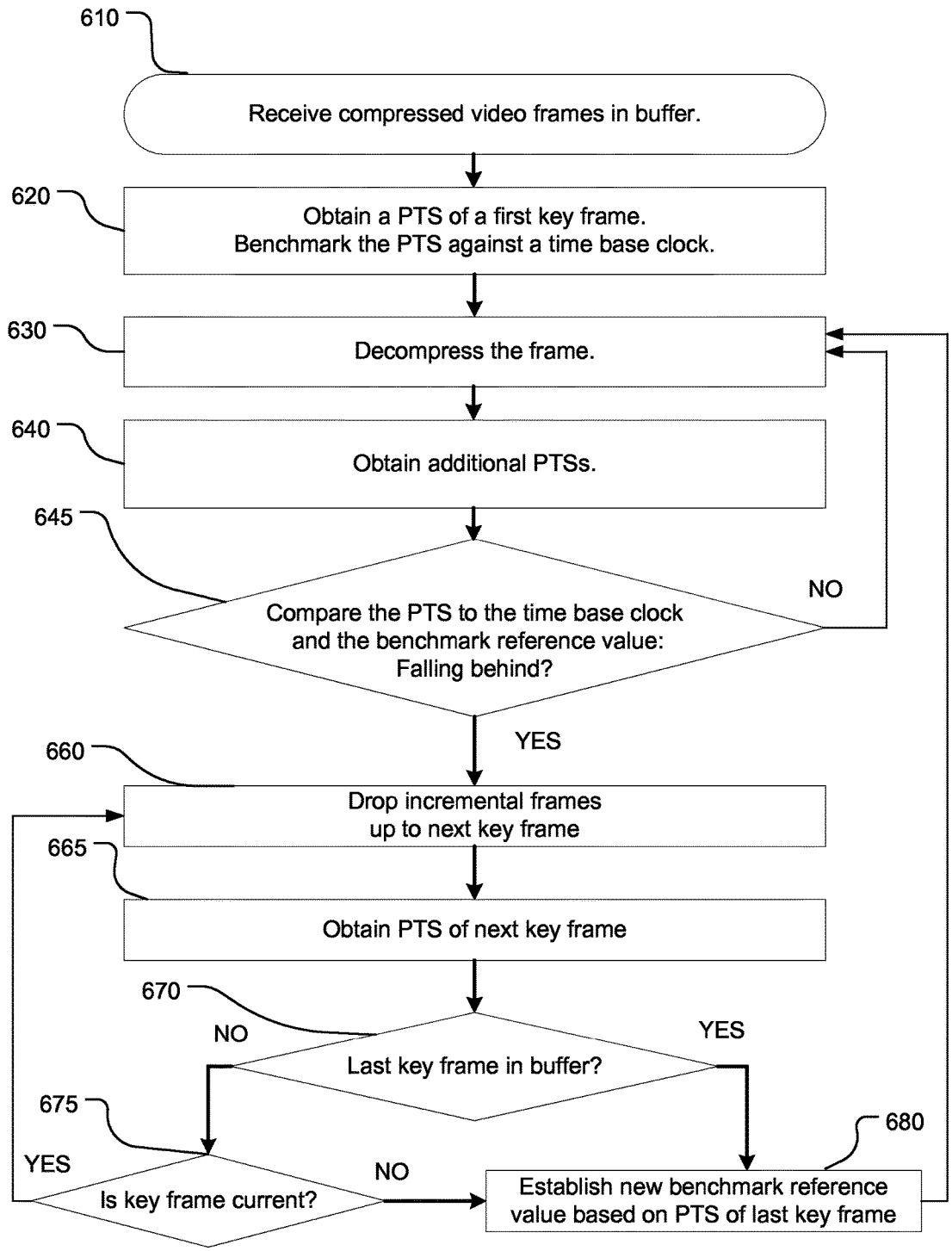
FIG. 6 shows a flow chart of an advanced process for deciding when to drop frames and how to select which frames are dropped.

This simplified process may be enhanced by using a more complex decision making process as described in FIG. 6.

FIG. 6 shows a flow chart of an advanced process for deciding when to drop frames, potentially including key frames. The difference between the advanced decision making process and the simplified decision process described in FIG. 5 is that instead of dropping incremental frames and choosing the next key frame for resynchronization, a search is done for the next key frame in the input buffer (460 in FIG. 4) that has a time difference between its PTS and the time base clock which is less than or equal to a second threshold chosen to increase the likelihood that the selected key frame has a PTS that is closest to the current time. The advantage of this approach is that a more current key frame may be found, i.e. a key frame which is more current with respect to real time as referenced to the time base clock. When a next key frame is found in the input buffer that meets this criterion it can be used to establish a new benchmark reference value to resynchronize the video stream. If no key frame that meets this criterion is found in the buffer then the last key frame found in the input buffer is used. If there are no key frames in the buffer then the process waits and uses the next key frame that arrives. In alternate embodiments there could be variations on this process such as using selected incremental frames that meet the criterion described above.

Working through FIG. 6, the process begins as described in the flowchart of FIG. 5: Step 610 receives video frames, step 620 obtains a PTS for the first key frame in the buffer and benchmarks it against the time base clock: DELTA_BENCH is calculated as before in FIG. 5 step 520, step 630 sends the frame to the decoder for decompression and thence to the presenter, step 640 obtains the PTS of the next frame for which a PTS is available. Step 645 calculates DELTA_NEXT as in FIG. 5 step 555: DELTA_NEXT=ABS((PTS of next frame)−(time base clock)). Step 645 then compares the difference between DELTA_NEXT and DELTA_BENCH to see if it exceeds a threshold as described in FIG. 5 step 555: If ((DELTA_NEXT−DELTA_BENCH)>THRESHOLD) then decompression resources are falling behind and the process proceeds to FIG. 5 step 560. Otherwise the process returns to step 630 to continue processing incoming frames.

The advanced decision process begins in FIG. 6 step 660 by dropping incremental frames up to the next key frame and then obtaining its PTS in step 665. In some implementations, it may be possible to drop only selected incremental frames and use a remaining incremental frame in place of the next key frame. Returning to the preferred embodiment: If this is the last key frame in the buffer, as per step 670, then a new benchmark reference value is established by setting resetting the benchmark reference value DELTA_BENCH=DELTA_NEXT and the process is continued as before by returning to step 630.

If, however, this is not the last key frame in the buffer, as per step 670, then a comparison is done in step 675 to detect if the PTS of the key frame is current with respect to the time base clock by taking the difference between DELTA_NEXT and DELTA_BENCH as before in step 645 but using a different threshold THRESHOLD_CURRENT: If ((DELTA_NEXT−DELTA_BENCH)>THRESHOLD_CURRENT) then the process will attempt to find a more current key frame by returning to step 660. Otherwise, the comparison indicates that a key frame has been found that may be used to resynchronize the system closer to real time operation with respect to the time base clock as described above. The PTS of this key frame and the time base clock will then be used to establish a new benchmark reference value the same as in FIG. 5 step 565 by setting the benchmark reference value DELTA_BENCH=DELTA_NEXT. The processing of incoming frames is then continued by returning to step 630. The minimum value of THRESHOLD_CURRENT should be greater than zero since if it is zero, then it may be necessary to drop all frames in the input buffer to find an acceptable current key frame and resynchronize. The maximum value of THRESHOLD_CURRENT should be set less than THRESHOLD to avoid the risk of resynchronizing unnecessarily. The maximum value of THRESHOLD_CURRENT can be estimated as follows:

MAX_THRESHOLD_CURRENT=(THRESHOLD)−(Frametime)

For instance if the frame rate is 30 frames per second then Frametime=$\frac{1}{30}^{th}$ second which is 33 milliseconds. If THRESHOLD is 200 milliseconds then:

MAX_THRESHOLD_CURRENT=200−33=167 milliseconds

In practice THRESHOLD_CURRENT should be set somewhere of the range between 1 and MAX_THRESHOLD_CURRENT with the intent to drop as few frames as possible but avoid unnecessary resynchronization. In the above example, setting THRESHOLD_CURRENT=100 milliseconds would be a good choice, and any value from 80 to 120 seconds would be expected to give good results as well. It is also possible to determine this value experimentally based on performance measurements for a range of selected values.

In addition to the advanced decision process in the flowchart of FIG. 6, it is possible in an alternate embodiment to make other optimizations. Using MPEG as an example, some incremental frames may be retained. In particular, all B-frames may be dropped and P-frames (which only depend on one other frame) processed. This is shown in the non-limiting example flowcharts FIG. 5 and FIG. 6. Other similar decision processes may be devised which take advantage of presentation time stamps, PTSs, to determine the currency of the frames in a video stream and drop selected frames so as to keep a video stream current with respect to real time as referenced to a time base clock such as a system clock. Additionally, it is possible in an alternate embodiment to implement a cost function which could determine which frames to drop in particular video streams. An example of this would be to assign a default priority of "high" or "normal" to incoming video streams and have the cost function use the advanced decision process for high priority streams and the simple decision process for normal priority streams. More complex cost functions can of course be devised, e.g., if a multiple processor computing device is available then a cost function could assign high priority streams to have their own processor and share remaining processors among normal priority processes. This would allow at least some of the high priority streams to be processed in parallel, subject to the number of available processors. In this way, the decompression resources of a system may be shared among multiple video streams so as to keep them current while gracefully degrading the decompression resources provided to each video stream.

Figure 7:
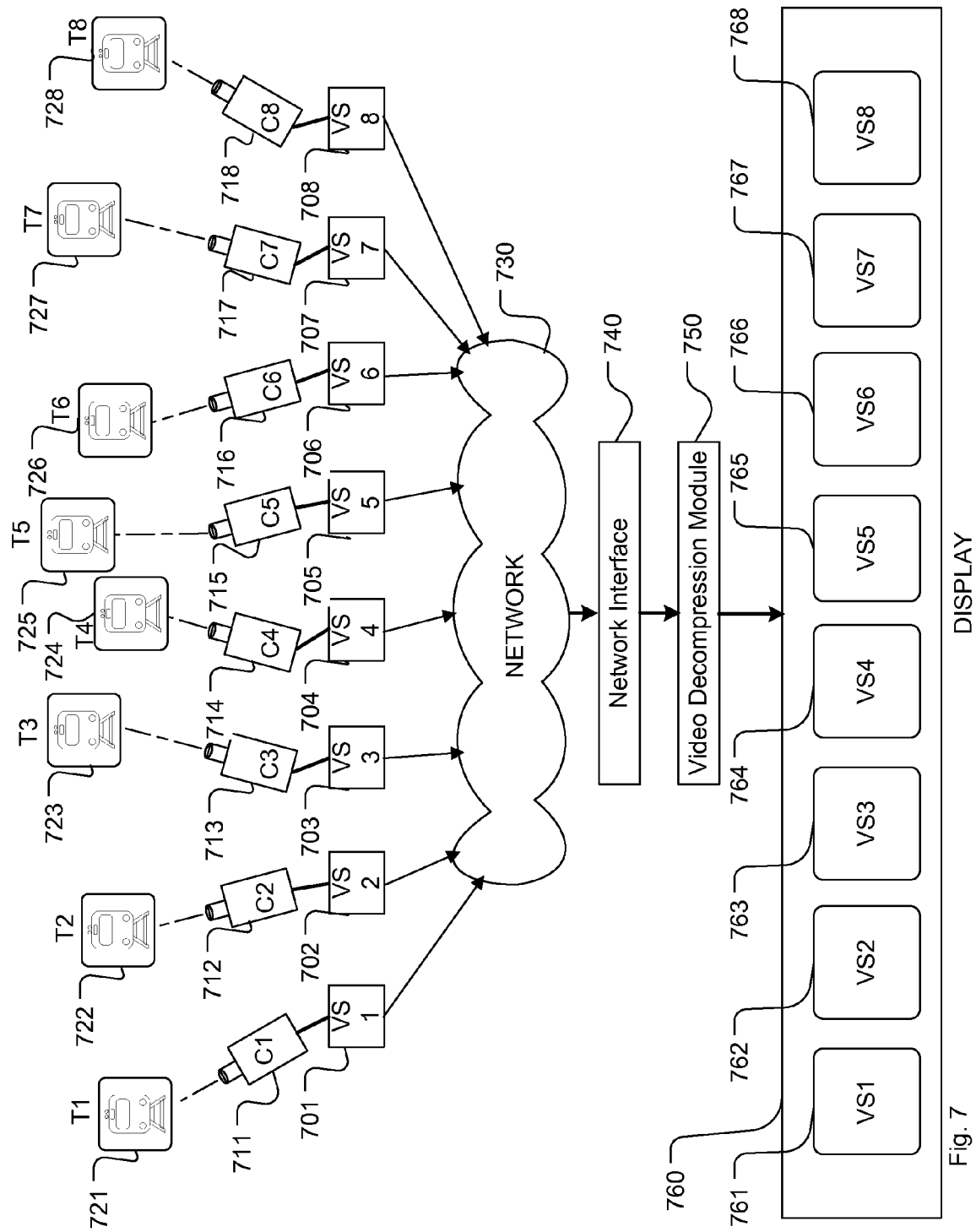
FIG. 7 shows a real world example of a surveillance system in which the technology disclosed may be applied to monitor several subway tracks.

FIG. 7 shows a real world example of a surveillance system in which the technology disclosed may be applied. The system shown in this example uses eight video cameras 711 through 718 to monitor a terminal having eight subway train tracks 721 through 728. Each video camera generates its own video stream of compressed video 701 through 708 which is sent via a network 730 to a network interface 740 and to a video decompression module 750. After decompression, frames are then sent to a display 760 and routed to their respective display windows 761 through 768, each of these corresponding to its associated video stream 701 through 708 respectively.

In this example, trains may arrive and leave at different times with some times being much busier than others, e.g. rush hour commute times. In such busy times trains may run more frequently to keep up with the increased passenger load. At other times some tracks may be continually busy and others much less busy, e.g. a large contingent of people departing for or arriving from a major sports or political event.

Consider a first scenario in which the terminal in the above example is operating at relatively low capacity with trains arriving and departing at relatively longer intervals from all tracks with light passenger loading. In this case only a few of the video streams may be active. In this case, frame dropping is not needed since the decompression resources are able to keep up with the incoming video streams without dropping frames.

Now consider an alternate scenario during the afternoon rush hour with more trains running more frequently and thousands of people arriving and departing from all tracks. At this point, more video cameras are brought online and therefore there are now more incoming video streams. Whereas in the first scenario the video decompression module 750 was able to keep the decompression current for all incoming frames, with the addition of more video streams, the decompression load in this example will increase to the point where the decompression resources cannot keep up. Consequently, the backlog for a particular stream will increase beyond a threshold. This threshold may be determined in a variety of ways. Here are some examples, none of which are intended to limit how the threshold is determined: it may be a default system design parameter based on estimated or known characteristics of the system, it may be dynamically calculated based on monitoring network characteristics such as jitter, or monitoring the activity level of the decompression resources (e.g., CPU load) or it may be a value set by a user. If dropping incremental frames for some of the video streams does not bring the delay below the threshold level, more incremental frames may be dropped, potentially in more video streams.

Consider application of the technology disclosed to the rush hour example above. Suppose the surveillance system is configured to zoom in on a particular track, for example track 725, when a train arrives or at the discretion of an operator who is viewing multiple video streams 761 through 768 on display 760. It is desirable to keep video stream 705 as current as possible. The system can drop incremental frames to keep the image displayed as current as possible.

The system could be configured to grant a higher priority to video stream 705, favoring frame dropping in other video streams.

In other circumstances, such as a security alert in which it was important to continually monitor all cameras, frame dropping could be distributed equally over all streams in order to preserve a full chronology of any security incidents.

Particular Implementations

The technology disclosed may be practiced as a method or device adapted to practice the method. The technology disclosed may be an article of manufacture such as media including computer instructions to gracefully reduce demands for shared decompression resources required to present more than eight video streams concurrently such that their streaming video content is simultaneously available for further processing or display. The technology disclosed may also be embodied as computer readable storage media including computer instructions that, when combined with hardware, create one of the devices disclosed herein.

The technology disclosed relies upon using presentation time stamps PTSs in an unusual way. A PTS indicates when a given frame is to be presented for display or further processing and is used to synchronize other streams such as an audio stream with a video stream. In an MPEG compliant video stream, a PTS is referenced to a clock value such as the program clock reference ("PCR") or system clock reference ("SCR"), both of which are transmitted in the transport stream or program stream which contains the video content. A PTS may be obtained by a variety of methods, including extracting it from header data in a video stream or calculating it using data from the video stream optionally in conjunction with known characteristics of the video stream such as the frame rate.

An example of how to obtain a PTS value for a frame for which an explicit PTS value is not present in video stream header data is to calculate it as follows:

(PTS value in seconds)=(Frame Number)*(1/Frame Rate) where:

Frame Number is referenced to the initial frame in a video stream or a frame designated as a reference frame such as the next key frame processed after a resync operation as in step 565 of FIG. 5 or step of FIG. 6, and Frame Rate is a known value for a video stream being received. As an illustrative example consider the PTS for a forty-second frame after a time zero key frame in a video stream with a Frame Rate of 24 frames per second, abbreviated FPS. The calculation is:

PTS of Frame 42=42*(1/24)=1.75 seconds

This technique may be extended by adding to the result the known PTS value of the reference frame used in the calculation.

It is important to note that a PTS only provides a presentation time for a frame and does not indicate whether or not decompression resources in a system are able to keep up with an incoming video stream, and if the decompression resources do become overloaded and fall behind then frames presented for display may appear pixelated, may be displayed at irregular intervals and may occasionally appear frozen.

The technology disclosed solves this problem by using PTS values in combination with a time base clock to create a benchmark reference value that can be used to detect when decompression resources are falling behind for a video stream. Upon detection, action may be taken to decrease the load on the decompression resources and thus remedy the problem.

In a preferred embodiment, a first key frame is received for decompression in a video stream for decompression. Following this, its PTS is benchmarked against a time base clock to calculate a time difference DELTA_BENCHMARK between the PTS and the time base clock which is used as a benchmark reference value. The first frame is then decompressed and additional frames are received from the video stream. PTSs are obtained for at least some of the additional frames and compared to the time base clock to calculate a time difference DELTA_NEXT. If the decompression resources are keeping up with the incoming video stream, i.e. able to decompress incoming frames in real time, then DELTA_BENCHMARK and DELTA_NEXT should differ by only a small amount not exceeding a given threshold, which in a typical system is approximately 500 milliseconds. If, however, the difference between DELTA_BENCHMARK and DELTA_NEXT exceeds the threshold, that is an indication that the decompression resources are falling behind in their ability to process incoming frames and action must be taken in order to continue to present current frames as established by the given threshold value. In particular, the presentation of frames may be said to be real time or concurrent as long as the difference between DELTA_BENCHMARK and DELTA_NEXT does not exceed the threshold. The explanations of the flowcharts shown in FIGS. 4 and 5 give specific details of the process.

However, the question arises as to what action should be taken if the difference between DELTA_BENCHMARK and DELTA_NEXT does exceed the threshold. In the preferred embodiment, the technology disclosed drops frames to decrease the load on decompression resources so that they may be able to keep an incoming video stream current.

As an illustrative example, in one case the load may increase for a particular video stream if the differences between frames increase, for instance in the case of a video camera streaming images of an airline terminal that is not crowded as opposed to when the same terminal is crowded with many flights landing and taking off during a major holiday period. Using the same example, the load could increase as several more video cameras are brought online to monitor the terminal during busy periods. If the video streams are being used for security purposes it is important that they be kept as current as possible and therefore it is desirable to reduce the load on the decompression resources to accomplish this.

The technology disclosed reduces the load on the decompression resources by dropping frames. In particular, dropping incremental frames is preferred. The rationale for this preference is that incremental frames often require more processing time to decompress than key frames, since by definition incremental frames depend on yet other frames which must be decompressed prior to decompressing an incremental frame. In contrast, key frames do not reference any other frame and hence do not require additional resources to decompress other frames.

In one embodiment in accordance with FIG. 5, all incremental frames are dropped and the next key frame is selected: in an MPEG compliant stream this would mean dropping both P-frames and B-frames. In another embodiment in accordance with FIG. 6, both key frames (I-frames in an MPEG compliant stream) and incremental frames (P-frames and B-frames in an MPEG compliant stream) may be dropped as needed to bring the decompression processing as current as possible. It will be apparent to one skilled in the art that there are many variants that may be used to decide which frames to drop, such as dropping only incremental frames which depend on two other frames: for instance, in an MPEG compliant stream this would mean dropping only B-frames.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

What is claimed is:

1. A method of reducing demands for shared decompression resources required to present a plurality of video streams concurrently, the method including:
   at a decompression processor in a computing device, receiving a key frame in each of the plurality of video streams for decompression;
   obtaining presentation time stamps, abbreviated PTSs, for the key frames, benchmarking a first PTS against one or more time base clocks to obtain benchmark reference values, and decompressing the key frames, wherein the presentation time stamps give presentation times at which the frames are to be presented or displayed;
   receiving additional frames in the plurality of video streams;
   obtaining additional PTSs for at least some subsequent additional frames;
   when particular additional PTSs for particular additional frames, as compared to the one or more time base clocks and the benchmark reference values, indicate that the particular additional PTSs have fallen behind their respective presentation times, by more than a threshold, at which the particular additional frames should be presented, responsively initiating dropping of incremental frames in the respective video streams at least until receipt of a further key frame to distribute the dropped incremental frames over at least a portion of the plurality of video streams; and
   decompressing at least some incremental frames that are not dropped in the plurality of video streams.

2. The method of claim 1, further including establishing a new benchmark reference value by benchmarking the further key frame against the time base clock.

3. The method of claim 1, further including:
   using the decompression processor to decompress eight or more video streams.

4. The method of claim 1, wherein:
   a first video stream includes first and second types of incremental frames;
   the first type of incremental frames depends on one additional frame; and
   the second type of incremental frames depends on two additional frames;
   further including dropping only the second type of incremental frames while continuing to process the first type of incremental frames.

5. The method of claim 1, wherein:
   the video stream includes first and second types of incremental frames;
   the first type of incremental frames are predictive P-frames compliant with an MPEG standard; and
   the second type of incremental frames are bidirectional B-frames compliant with an MPEG standard;
   further including dropping only the B-frames while continuing to process the P-frames.

6. The method of claim 1, wherein at least some of the PTSs are extracted from the header data before decompression.

7. The method of claim 1, wherein some of the PTSs are calculated at least in part based on other fields in header data.

8. The method of claim 1, wherein some of the PTSs are based on a frame rate of the video stream.

9. The method of claim 1, further applied to more than eight video steams concurrently.

10. The method of claim 1, further applied at least partially in parallel by multiple processors to more than eight video streams concurrently.

11. The method of claim 9, wherein:
    the determinations to drop frames are distributed among the video streams according to a cost function.

12. A computer system for reducing demands for shared decompression resources required to present a plurality of video streams concurrently, the system including:
    a processor and a non-transitory computer readable storage medium storing computer instructions configured to cause the processor to:
    receive a key frame in each of the plurality of video streams for decompression by a decompression processor;
    obtain presentation time stamps, abbreviated PTSs, for each of the key frames, benchmark the PTSs against one or more time base clocks to obtain benchmark reference values, and decompress the key frames, wherein the presentation time stamps give presentation times at which the frames are to be presented or displayed;
    receive additional frames in the plurality of video streams;
    obtain additional PTSs for at least some subsequent additional frames;
    when particular additional PTSs for particular additional frames, as compared to the one or more time base clocks and the benchmark reference values, indicate that the particular additional PTSs have fallen behind their presentation times, by more than a threshold, at which the particular additional frames should be presented, responsively initiate dropping of incremental frames in the respective video streams at least until receipt of a further key frame; and
    decompress at least some incremental frames that are not dropped in the plurality of video streams.

13. The system of claim 12, further configured to cause the processor to:
    establish a new benchmark reference value by benchmarking the further key frame against the time base clock.

14. The system of claim 12, further configured to cause the processor to:
    apply the decompression processor to decompression of eight or more video streams.

15. The system of claim 12, wherein:
    the video stream includes first and second types of incremental frames;
    the first type of incremental frames depends on one additional frame;
    the second type of incremental frames depends on two additional frames; and
    further configured to cause the processor to drop only the second type of incremental frames while continuing to process the first type of incremental frames.

16. The system of claim 12, wherein:
the video stream includes first and second types of incremental frames;
the first type of incremental frames are predictive P-frames compliant with an MPEG standard;
the second type of incremental frames are bidirectional B-frames compliant with an MPEG standard; and
further configured to cause the processor to drop only the B-frames while continuing to process the P-frames.

17. The system of claim 12, wherein:
at least some of the PTSs are extracted from header data before decompression.

18. The system of claim 12, wherein:
some of the PTSs are calculated at least in part based on other fields in header data.

19. The system of claim 12, wherein:
some of the PTSs are based on a frame rate of the video stream.

20. The system of claim 12, further configured to cause the processor to process more than eight video streams concurrently.

21. The system of claim 12, further configured with multiple processors to process at least partially in parallel more than eight video streams concurrently.

22. The system of claim 20, wherein:
the determinations to drop frames are distributed among the video streams according to a cost function.

23. A non-transitory computer readable storage medium storing computer instructions configured to cause a processor to:
receive a key frame in each of a plurality of video streams for decompression by a decompression processor;
obtain presentation time stamps, abbreviated PTSs, for each of the key frames, benchmark the PTSs against one or more time base clocks to obtain benchmark reference values, and decompress the key frames, wherein the presentation time stamps give presentation times at which the frames are to be presented or displayed;
receive additional frames in the plurality of video streams;
obtain additional PTSs for at least some subsequent additional frames;
when particular additional PTSs for particular additional frames, as compared to the one or more time base clocks and the benchmark reference values, indicate that the particular additional PTSs have fallen behind their presentation times, by more than a threshold, at which the particular additional frames should be presented, responsively initiate dropping of incremental frames in the respective video streams at least until receipt of a further key frame; and
decompress at least some incremental frames that are not dropped in the plurality of video streams.

24. The non-transitory computer readable storage medium of claim 23, further configured to cause the processor to:
apply the decompression processor to decompression of eight or more video streams.

25. The non-transitory computer readable storage medium of claim 23, wherein:
the video stream includes first and second types of incremental frames;
the first type of incremental frames depends on one additional frame;
the second type of incremental frames depends on two additional frames; and
further configured to cause the processor to drop only the second type of incremental frames while continuing to process the first type of incremental frames.

* * * * *